June 2, 1959  R. E. CLAYTON  2,889,307
WEATHER RESISTANT WHITE COMPOSITION CONTAINING BUTYL RUBBER
Filed March 18, 1955
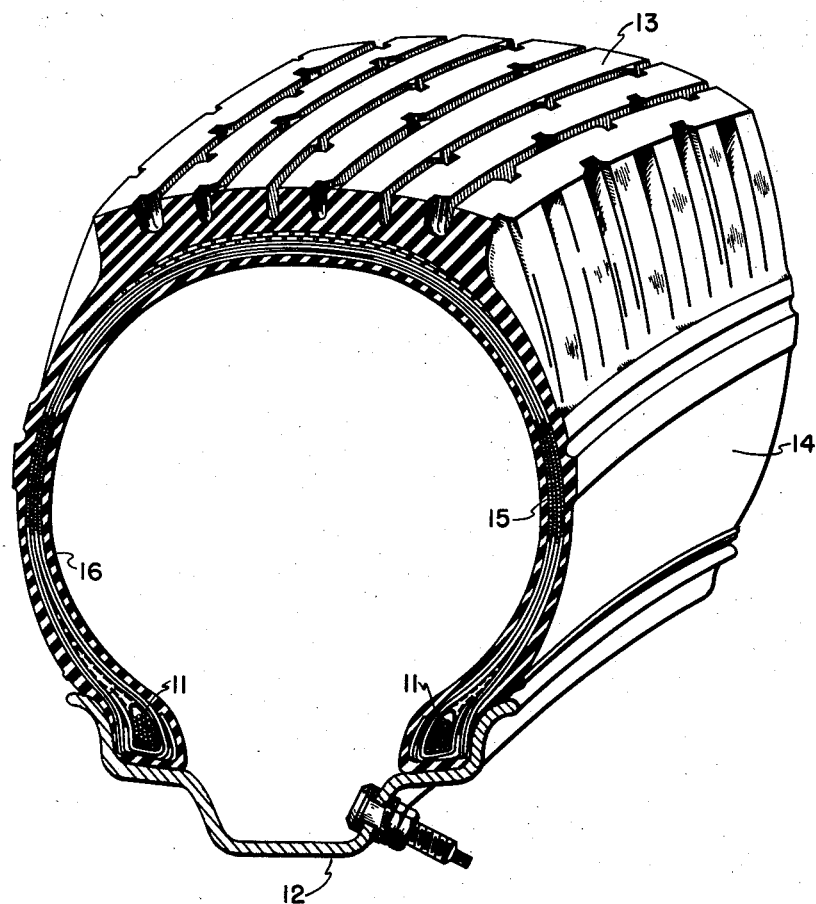
Robert E. Clayton   Inventor
By W. H. Smyers   Attorney 2,889,307

WEATHER RESISTANT WHITE COMPOSITION CONTAINING BUTYL RUBBER

Robert E. Clayton, Roselle Park, N.J., assignor to Esso Research and Engineering Company, a corporation of Delaware Application March 18, 1955, Serial No. 495,122

8 Claims. (Cl. 260—41.5)

This invention relates to vulcanizable light colored rubbery polymeric compositions of improved weathering and discoloring resistance and relates more particularly to vulcanizable and vulcanized rubbery copolymers of isoolefins and multiolefins in composition with certain proportions of magnesium oxide, titanium dioxide, and zinc oxide, wherein relatively large amounts of magnesium oxide are present.

When Butyl rubber is compounded with carbon black and cured, the product exhibits exceptionally good weathering resistance. However, Butyl rubber white vulcanizates have heretofore weathered badly, becoming tacky and discolored. This has been a serious deterrent to the use of Butyl rubber white sidewall tires, although Butyl rubber is primarily of interest for premium grade tires and premium tires are made with white sidewalls. The automotive industry, as well as other industries, is also desirous of making white and pastel colored parts from Butyl rubber that will look attractive and in harmony with various painted parts and upholstery. Also, in the insulated wire industry, it would be desirable to make white and pastel shades of Butyl rubber insulations, plug coverings, etc. Furthermore, white and pastel colored Butyl rubber vulcanizates are envisioned in household equipment.

According to the present invention, it has now been discovered that when Butyl rubber is combined with magnesium oxide, as well as titanium dioxide and zinc oxide, white vulcanizates may be obtained which resist weathering, discoloration, do not craze, and do not crack.

It has further been found that particularly good results are obtained when relatively large amounts of magnesium oxide such as at least about 15 parts by weight up to about 100 parts by weight of magnesium oxide per 100 parts of Butyl rubber are employed. These proportions of magnesium oxide are advantageously combined with about 10 to 150 parts by weight of titanium dioxide, and about 5 to 50 parts by weight of zinc oxide per 100 parts of Butyl rubber.

In one embodiment, the vulcanizable polymer base of the present invention comprises about 100 parts of a copolymer of a minor proportion of a conjugated multiolefin having about 4 to 14 carbon atoms (preferably about 4 to 10 carbon atoms) and a major proportion of an isoolefin of about 4 to 8 carbon atoms. To this is added preferably about 25 to 100 parts magnesium oxide, about 25 to 125 parts of titanium dioxide and about 10 to 50 parts of zinc oxide.

Preferably, the vulcanizable polymer base to be employed in accordance with the invention comprises a copolymer of about 70 to 99% (especially 90 to 99%) of isobutylene and about 30 to 1% (especially 10 to 1%) of a conjugated diolefin selected from the class consisting of isoprene, butadiene, dimethylbutadiene, dimethallyl, myrcene, piperylene, allo-ocimene, mixtures and equivalents thereof.

In a preferred embodiment, the present invention comprises an improved vulcanized rubbery white synthetic isoolefin-diolefin rubber composition which has been produced by the process which comprises heating in the presence of vulcanizing amounts of sulfur (preferably about .5 to 5 parts of sulfur) about 100 parts of a non-straining copolymer of about 95–99% isobutylene and about 1–5% isoprene, about 50–100 parts by weight of magnesium oxide, about 50 to 100 parts by weight of titanium dioxide, and about 10 to 20 parts by weight of zinc oxide and advantageously in the presence of about 0.5 to 2 parts by weight (preferably about .75 to 1.25 parts by weight) of known non-straining accelerators such as an accelerator of the general formula

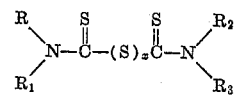

wherein R, $R_1$, $R_2$, and $R_3$ represent aliphatic hydrocarbon radicals, advantageously alkyl groups having about 1 to 6 carbon atoms (preferably 1 to 4 carbon atoms; e.g. tetra butyl thiuram disulfide) and $x$ represents an integer of about 1 to 5 and is preferably 2. Tetramethyl thiuram disulfide has been found to be a particularly advantageous accelerator. Other less preferred non-straining accelerators include zinc polyalkyl dithiocarbamates containing preferably about two alkyl groups of about 1 to 5 carbon atoms including such compounds as zinc dimethyldithiocarbamate. Also, about 0 to 10 parts (and preferably about 0.5 to 5 parts) by weight of stearic acid may be present as a mold release agent and about 0 to 5 parts (and advantageously 0.1 to 0.5 part) to ultramarine blue per 100 parts of the copolymer may likewise be present whereby to produce a white synthetic rubber which is resistant to weathering and discoloring and is suitable for producing the white sidewalls of premium grade automobile tires, the surfaces of which may be optionally dusted with an anti-tack agent such as talc, mica, certain comminuted clays, etc., as hereinafter described.

The invention will be more apparent by reference to the accompanying drawing in which the single figure is a cross-sectional view in perspective of a pneumatic tubeless tire employing therein the Butyl rubber of the present invention wherein the tire is depicted as being molded on a conventional tubeless-type of tire wheel-rim. Also, although the following description of the drawing is confined to a tubeless-tire, obviously the Butyl rubber composition of the present invention may be likewise employed in conventional inner-tube containing tires.

The pneumatic tubeless tire comprises a hollow toroidal type member which is substantially U-shaped in cross-section by virtue of an open portion which extends around the inner periphery of the member. In other words, the member is of a tubular type structure which has a cross-section in the form of an open-bellied body with spaced terminal portions to define a member generally resembling a horseshoe, wherein the open portion of the horseshoe-shaped member faces toward the interior circumference of said member. The terminal portions constitute the bead portions 11—11 of the tire, inside of which are a plurality of bead wires adhesively embedded and molded in a rubber. The outer surface of the bead portion is advantageously formed into an air sealing means such as a plurality of ribs to aid in adhesion to rim 12 when the tire is inflated. The remaining outer surface of the tire also includes tread area 13 and sidewalls 14. The remaining construction of the tire may vary according to conventional fabrication but in general the tire is a multi-layered type of structure with an outer layer as above-mentioned. The layer next adjacent the outer layer generally comprises a carcass 15 which includes a rubber such as Butyl rubber which has incorporated therein a fabric composed of a plurality of cotton, rayon, or nylon cords, etc. The tire also includes an inner lining 16, advantageously made from Butyl rubber which must be substantially impermeable to air. The lining may also advantageously comprise a rubbery copolymer of about 20–99 weight percent of a $C_4$–$C_7$ isoolefin such as isobutylene and about 1–80 weight percent of a $C_4$–$C_{14}$ multi-olefin such as isoprene which has been at least partially vulcanized at least at about 240–350° F. with from about 0.2–10.0 weight percent sulfur based on the weight of the copolymer. The above multi-layers, at least three in number, are conventionally bonded or otherwise adhered together; for example, by vulcanization to form a tire of a unitary structure.

The Butyl rubber of the present composition is employed as the sidewall for the rubber tire and is either white or pastel colored and likewise conventionally bonded or otherwise adhered (especially by vulcanization) to the tire to form a unitary structure. In one embodiment, the tubeless tire comprises a casing of an outer layer including a tread, sidewall, and outer bead portions, etc. wherein the sidewall comprises a rubbery copolymer of a major proportion of an isoolefin and a minor proportion of a multi-olefin, and magnesium oxide, titanium dioxide and zinc oxide in amounts according to the present invention. The tire also may advantageously comprise an intermediate layer or carcass of natural or synthetic rubbers or mixtures of natural and/or synthetic rubbers. The tire also contains an inner layer of Butyl rubber which has been at least partially vulcanized by heating for about 3–60 minutes or more at about 240–350° F. with about 0.2–10.0 weight percent sulfur on a basis of the weight of the Butyl rubber. In conventional fabrication, the sidewall, as well as the various other components of the tire, are adhesively formed into the unitary structure by vulcanization.

Copolymers of the above general type, especially where the copolymer is of isobutylene with a conjugated diolefin are commonly referred to in patents and literature as "Butyl rubber" or GR–I rubber (Government Rubber-Isobutylene) and, for example, is referred to as "Butyl rubber" in U.S. Patent 2,656,297, lines 11, 19, 48, 51, in textbook "Synthetic Rubber" by G. S. Whitby (1954 edition by John Wiley & Sons, Inc.), pages 608–9, etc. The expression "Butyl rubber" as employed in the specification and claims is defined essentially as a copolymer of about 90–99% by weight of an isoolefin of about 4 to 7 carbon atoms and about 10–1% of a conjugated diolefin of about 4 to 8 carbon atoms. The preparation of Butyl type rubbers is described in U.S. Patent 2,356,128 to Thomas et al.; 2,392,847, 2,471,887, 2,620,323, etc. as well as in literature. In one process for the preparation of Butyl rubber, a low molecular weight isoolefin, preferably isobutylene, is reacted with a conjugated diolefin, preferably isoprene, at relatively low temperatures; preferably from about 0° C. to about —180° C. or lower; an advantageous range being from about —40° C. to about —160° C., preferably from about —80° C. to —100° C., and is conducted in the presence of a Friedel-Crafts catalyst such as aluminum chloride, titanium tetrachloride, boron trifluoride, uranium chloride, aluminum ethoxy-chloride, etc. dissolved in an alkyl halide such as ethyl or methyl chloride, or dissolved in carbon disulfide or equivalent solvent.

One particularly advantageous Butyl rubber is produced with the preferred reactants being about 1 to 5 parts by weight of isoprene and about 99 to 95 parts by weight of isobutylene and the mixture of these reactants is cooled to a temperature within the range of about —40° C. to —160° C. and then polymerized by the addition thereto of a catalyst solution of an aluminum halide. The resulting copolymer preferably has a Staudinger molecular weight between about 25,000–100,000. When so prepared, the material is rubbery in nature, has the property of being curable with sulfur especially in the presence of organic sulfides, particularly of the tetra alkyl thiuram sulfide type, as above-mentioned.

In another embodiment, pastel colored Butyl rubber compositions as distinguished from white compositions may be prepared wherein the cure is effected in the presence of such materials as p-dinitrosobenzene, p-quinone dioxime, etc. and their various homologs and derivatives. Furthermore, for pastel colored Butyl rubbers, the cure may be in the presence of such compositions as (1) sulfur and a zinc dialkyl polythiocarbamate; (2) sulfur, lead oxide, and p-quinone dioxime; (3) sulfur, benzothiazyl disulfide and p-quinone dioxime (4) p-quinone dioxime dibenzoate, lead oxide and sulfur; and (5) sodium and tellurium containing compositions. However, to produce a white Butyl rubber, the above compositions are less desirable than the preferred sulfur tetra alkyl thiuram disulfide containing curing composition. In a preferred embodiment to produce pastel colored Butyl rubbers, the vulcanization is accomplished by sulfur in the presence of a tetra alkyl thiuram sulfide and also in the presence of at least 15 weight percent magnesium oxide as well as titanium dioxide and zinc oxide and the desired color is then obtained by adding an additional pigment or pigments to the composition as desired.

Suitable pigments when employed in minor quantities for pastel Butyl rubbers but which are generally unsatisfactory for white Butyl rubber compositions are as follows: lead oxide, lead carbonate, barytes, lead sulphate, cadmium lead, calcium carbonate, ferric hydroxide, lead iron oxide, chrome-yellow lead chromate, Prussian blue, phthalocyanine, etc. Inorganic pigments are generally preferred and are employed either alone or in combination with organic pigments according to the color desired. For pastel colored rubbers as distinguished from white rubbers, the white colored representatives of the above pigments or their equivalents may in some cases replace at least a portion of the titanium dioxide.

The copolymer of the invention which has been cured, has an improved elastic limit, tensile strength, abrasion resistance and flexure resistance. Also, the mixture before curing may be compounded with various fillers, pigments, plasticizers, and anti-oxidants, etc. For example, generally small amounts of conventional non-staining anti-oxidants or even a slightly colored anti-oxidant such as phenyl beta naphthylamine may be employed. The non-staining anti-oxidants which are particularly efficacious for white Butyl rubber, comprises about 0.1–0.75%, and preferably about 0.25%, of either alkylated aromatic hydrocarbons or alkylated heterocyclics and includes especially the following:

I.
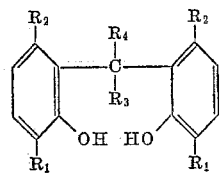

wherein the above anti-oxidant represents an alkylated bisphenol wherein $R_1$ is a tertiary alkyl group of 3 to 5 carbon atoms and is preferably a tertiary butyl group, $R_2$ represents a $C_1$ to $C_8$ alkyl group (preferably ethyl or methyl) and $R_3$ and $R_4$ represent hydrogen or a $C_1$ to $C_5$ alkyl group. A representative compound is bis(2-hydroxy-3-tertiary butyl-5-methyl phenyl) methane.

II.

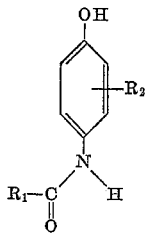

wherein $R_1$ represents a $C_1$ to $C_{14}$ alkyl group (preferably a $C_8$–$C_{14}$ alkyl group) and $R_2$ represents an alkyl group of from 0–18 carbon atoms. A representative compound is lauroyl p-aminophenol.

III. A $C_5$ to $C_9$ alkylated diphenylamine such as heptylated diphenylamine.

The present invention will be best understood from a description of the following specific embodiments.

Five different Butyl rubbers were prepared as follows:

*Butyl #1.*—A copolymer of isobutylene and isoprene was prepared as above-outlined, by mixing 99 parts by weight of isobutylene of 98% purity with 1 part by weight of isoprene of 96% purity. This material was diluted with approximately 250 parts by weight of liquid methyl chloride, and cooled to a temperature in the neighborhood of about −164° C. To this cold mixture there was then added approximately 50 parts by weight of liquid methyl chloride containing dissolved therein approximately 0.15 part by weight of aluminum chloride. The aluminum chloride solution was added in the form of a fine jet under pressure to the body of the rapidly stirred, cold olefinic mixture. The polymerization reaction began immediately and proceeded rapidly to the stage approximately 65% conversion of the olefinic material into the polymer; this amount of catalyst being insufficient to convert the whole of the olefinic material into polymer. The polymer recovery had an iodine number of about 2.3.

*Butyl #2.*—A copolymer of isobutylene and isoprene was prepared by the same general process of preparing Butyl #1 but at a temperature of −40° C. and employing 1.5% concentration of the catalyst whereby the whole of the olefinic materials was converted into polymer.

*Butyl #3.*—A copolymer of isobutylene and isoprene was prepared by the same general process for preparing Butyl #2, but from a mixture of 97.5 parts of isobutylene, and 2.5 parts of isoprene, and finished by the procedure shown for Butyl #1, except that continuous polymerization was used, the temperature was −100° C. and the concentration of the catalyst was 5%. A conversion of 100% of the olefinic materials into polymer was obtained.

*Butyl #4.*—A copolymer of isobutylene and isoprene was prepared, by the same general process for preparing Butyl #2 but at −100° C. from a mixture of about 90 parts of isobutylene and about 10 parts of isoprene and employing a catalyst concentration of about 7.5%. A conversion of 100% of the olefinic materials into polymer was obtained.

*Butyl #5.*—A copolymer of isobutylene and butadiene was prepared by the same general process for preparing Butyl #2, but at a polymerization temperature of −78° C. and a 5% catalyst concentration was employed and 97.5 parts of isobutylene were employed to 2.5 parts of butadiene.

The use of the above five Butyl rubbers in accordance with the present invention is illustrated in the following examples:

EXAMPLES 1–3

Portions of the copolymers of Butyl #2, 3, 4 and 5 were vulcanized in the presence of (a) titanium dioxide, (b) zinc oxide, (c) titanium dioxide and zinc oxide, and (d) titanium dioxide, zinc oxide, and magnesium oxide, as hereinafter indicated. The use of tetramethyl thiuram disulfide was also advantageously employed as the particular accelerator to accelerate the vulcanization. Stearic acid was optionally but preferably employed as a mold release agent and ultramarine blue was optionally but preferably employed to obtain a whiter product. The vulcanization was for about 40 to 60 minutes at 295° F. to about 4 to 8 minutes at 350° C.; the higher the vulcanizing temperature, the shorter the permissible vulcanizing time and vice versa. The optimum vulcanization conditions appeared to be within the range of about 8 to 25 minutes at about 325° F. to 335° F.

EXAMPLE 1

*Run 1.*—100 parts of the copolymer designated as Butyl #2 was admixed with 100 parts of titanium dioxide and 10 parts zinc oxide; (all ratios being parts by weight). The above composition was vulcanized with 2 parts by weight of sulfur and 1.25 parts by weight of tetramethyl thiuram disulfide for 23 minutes at 330° F. and was aged in straight and in looped form according to A.S.T.M. Standard Method D518–44. The composition became tacky and badly discolored in about 4 weeks.

*Run 2.*—The above run was repeated, but with addition of 50 parts magnesium oxide, and after 14 months, the composition was not cracked, crazed, or discolored and its surface was dry.

EXAMPLE 2

*Run 1.*—The copolymer designated as Butyl #4 was composited with 100 parts by weight of titanium dioxide and 10 parts by weight of zinc oxide, per 100 parts of copolymer. The composition was vulcanized with 3 parts by weight of sulfur and 1.5 parts by weight of tetramethyl thiuram disulfide for 23 minutes at 330° F. The composition became tacky and badly discolored in 8 weeks when aged in straight and in looped form according to A.S.T.M. Standard Method D518–44.

*Run 2.*—The above run was repeated but with the addition of 50 parts by weight of magnesium oxide per 100 parts of the copolymer. After 14 months, the composition was not cracked, crazed, or discolored and its surface was dry.

EXAMPLE 3

*Run 1.*—The copolymer designated as Butyl #5 was composited with 100 parts of titanium dioxide and 10 parts by weight of zinc oxide per 100 parts of the copolymer. The copolymer was then vulcanized for 23 minutes at 330° F. with 2 parts by weight of sulfur and 1.25 parts by weight of tetramethyl thiuram disulfide. The above vulcanizate was aged in straight and in looped form according to A.S.T.M. Standard Method D518–44 and the composition became tacky and badly discolored after about 8 weeks.

*Run 2.*—The above run was repeated but with the addition of 50 parts by weight of magnesium oxide per 100 parts of the copolymer. After 14 months, the vulcanizate was not cracked, crazed, or discolored, and the surface was dry.

EXAMPLE 4

The copolymer designated as Butyl #3 was composited with various amounts of titanium dioxide, zinc oxide and magnesium oxide per 100 parts by weight of copolymer. These compositions were then vulcanized for 23 minutes at 330° F. in the presence of 2 parts by weight of sulfur and 1.25 parts by weight of tetramethyl thiuram disulfide. The above vulcanizate was then aged in straight and in looped form according to A.S.T.M. Standard Method D518-44. The results are now tabulated in Table I:

Table I

[Parts by weight]

| Run | TiO₂ | ZnO | MgO | Time | Tacky | Discoloration | Cracking | Crazing |
|---|---|---|---|---|---|---|---|---|
| 1 | 100 | | | | | | | |
| 2 | | 10 | | 8 weeks | Yes | Bad | Slight | Slight. |
| 3 | 100 | 10 | | do | Yes | do | do | Do. |
| 4 | 100 | 10 | 50 | 14 months | No | None | None | None. |
| 5 | 100 | | 50 | | | | | |
| 6 | | 10 | 50 | 6 months | No | Poor | Very slight | Slight. |
| 7 | | | 50 | | | | | |

The above runs in Table I of Example 4 demonstrate that the use of titanium dioxide alone, zinc oxide alone, or a combination of titanium dioxide, and zinc oxide do not improve the discoloration, cracking and crazing, whereas applicant's three-component composition including about 50 parts by weight of magnesium oxide, in addition to the 100 parts by weight of titanium dioxide and 10 parts by weight of zinc oxide per 100 parts of the copolymer produces a vastly improved composition with substantially no discoloration, cracking or crazing. The omission of the zinc oxide gave essentially no vulcanization and the omission of the titanium dioxide gave a composition of poorer discoloration and poorer original whiteness.

EXAMPLES 5-17

Additional runs were conducted with the copolymer designated as Butyl #3 at essentially the polymerization and vulcanization conditions given in Example 4, except where otherwise stated. The results are tabulated in Table II:

150 parts by weight (Example 7), since within this range, providing that the amounts of the magnesium oxide and zinc oxide are properly regulated, there is no discoloration, cracking or crazing.

As regards the parts by weight of zinc oxide, a comparison of Examples 6 and 7 indicate that the composition "slightly" discolors and cracks when only employing 5 parts by weight of zinc oxide (Example 6), whereas when employing 10 parts by weight of zinc oxide (Example 7), the discoloration as well as the cracking and crazing is substantially non-existent. The composition of Example 5 which employs 50 parts by weight of zinc oxide is also suitable in that there is no discoloration, cracking or crazing of the ultimate composition. Accordingly, although the preferred range for the zinc oxide is broadly 5 to 50 parts by weight, considering that larger amounts of magnesium oxide may advantageously be employed in the composition, and the total pigment loading should not be too high for utility, a narrower but advantageous range for the zinc oxide is from about 10 to 30 parts by weight and especially from about 15 to 25 parts by weight.

Table II

[Parts by weight per 100 parts of copolymer]

| Example | TiO₂ | ZnO | MgO | Time (months) | Tacky | Discoloration | Cracking | Crazing |
|---|---|---|---|---|---|---|---|---|
| 5 a b | 74 | 50 | 18.5 | 14 | No | None | None | None. |
| 6 a c | 150 | 5 | 50.0 | 14 | No | Very slight | Very slight | Do. |
| 7 a c | 150 | 10 | 50 | 14 | No | None | None | Do. |
| 8 a d | 20 | 25 | 100 | 14 | No | do | do | Do. |
| 9 a e | 10 | 15 | 25 | 14 | No | do | do | Do. |
| 10 a f | 40 | 25 | 15 | 14 | No | do | do | Do. |
| 11 a g | 75 | 10 | 5 | 14 | No | Poor | Very slight | Very slight. |
| 12 a g | 75 | 10 | 25 | 14 | No | None | None | None. |
| 13 a g | 75 | 15 | 15 | 10 | No | do | do | Do. |
| 14 a g | 75 | 15 | 5 | 10 | No | Poor | Very slight | Very slight. |
| 15 a g | 75 | 15 | 2 | 10 | Slight | Bad | Slight | Do. |
| 16 a g | 75 | 15 | | 10 | Bad | do | do | Slight. |
| 17 g | 75 | | 15 | 10 | (¹) | (¹) | (¹) | (¹) |

¹ Essentially no vulcanization.
ᵃ The tensile strength, percent of elongation, tensile modulus and Shore hardness were all satisfactory.
ᵇ 3 parts by wt. of sulfur, 1 part by wt. of tetramethyl thiuram disulfide, vulcanized for 60 min. at 295° C.
ᶜ 3 parts by wt. of <325 mesh sulfur, .5 part by wt. of tetramethyl thiuram disulfide, vulcanized for 4 min. at 350° F.
ᵈ 0.1 part by wt. of ultramarine blue, 1.5 parts by wt. of sulfur, .5 part by wt. of tetraethyl thiuram disulfide, .25 part of phenyl beta naphthylamine, vulcanized for 20 min. at 330° F.
ᵉ 4 parts by wt. of <250 mesh sulfur, 2 parts by wt. of tetramethyl thiuram disulfide, 5 parts by wt. stearic acid as a mold release agent, .25 part of phenyl beta naphthylamine, vulcanized for 23 min. at 330° F.
ᶠ .05 part by wt. of ultramarine blue, 1.75 parts by wt. of sulfur, 2 parts by wt. of tetra butyl thiuram disulfide, vulcanized for 28 min. at 335° F.
ᵍ 1 part by wt. stearic acid, .20 part by wt. of ultramarine blue, 10 parts by wt. of zinc oxide, 2 parts by wt. of sulfur, and 1.25 parts by wt. of tetra methyl thiuram disulfide, vulcanized at 330° F. for 23 minutes.

From the data in Table II of Examples 5-17, it is noted that an overall range of parts by weight of magnesium oxide per 100 parts of the copolymer is about 15 parts by weight (Example 10) to about 100 parts by weight (Example 8), since in Example 11 where the amount of magnesium oxide was reduced to 5 parts by weight there was noticeable cracking and crazing and the discoloration was poor. Example 12, which was run under the identical conditions as Example 11 but contained 25 parts by weight of magnesium oxide, rather than 5 parts by weight of magnesium oxide, gave no discoloration, cracking or crazing. As for the amount of titanium dioxide, the range given in the table includes about 10 parts by weight (Example 9) to about Examples 13 to 16 show that whereas the use of at least 15 parts by weight of magnesium oxide (as in Example 13) improves discoloration, cracking and crazing, that each of these characteristics are not satisfactory when only 5 parts by weight of magnesium oxide are employed (Example 14), and the results become progressively poorer as the amount of magnesium oxide is decreased (as in Examples 15 and 16).

EXAMPLES 18-20

Although the above examples, as indicated, revealed a fairly wide overall operating range for the amounts of added titanium oxide, magnesium oxide, and zinc oxide; in order to determine the most preferred ratios and proportions of these ingredients, the following three experiments were run and results analyzed in detail as to their tensile strength, elongation, tensile modulus, and Shore hardness.

In each example, 100 parts by weight of the copolymer designated as Butyl #3 was admixed with the amounts by weight of titanium dioxide, magnesium oxide and zinc oxide as hereinafter indicated, with 1 part by weight stearic acid, and with the below-indicated amounts by weight of ultramarine blue. The resulting compositions were vulcanized for 23 minutes at 330° F. in the presence of 2 parts by weight of sulfur, and 1.25 parts by weight of tetra methyl thiuram disulfide. However, the surface of the freshly cured white rubbery copolymer of Example 20 was dusted with an excess of talc and then wiped clean in order to preclude any tackiness. The above vulcanizates were then aged in straight and in looped form according to A.S.T.M. Standard Method D518-44. After 14 months, the specimens were not cracked, crazed or discolored, and the surfaces thereof were dry and not tacky. The results were all satisfactory and are now tabulated:

*Table III*

[Parts by weight per 100 parts of copolymer]

| Ex. | TiO₂ | ZnO | MgO | Ultramarine blue | Tens. str., p.s.i. | Percent elong. | Tens. mod. at 300% elong. | Shore hardness |
|---|---|---|---|---|---|---|---|---|
| 18 | 75 | 10 | 25 | 0.20 | 1,345 | 585 | 390 | 55 |
| 19 | 100 | 10 | 50 | 0.25 | 1,560 | 695 | 450 | 69 |
| 20 | 50 | 10 | 100 | 0.15 | 1,350 | 680 | 490 | 74 |

Comparing the above preferred ranges embodied in the last three examples, the composition of Example 18 is the softest and most flexible of the three. Its original whiteness and its resistance to discoloration and tackiness upon aging are very good. The composition of Example 19 is not quite as flexible as that of Example 18, but it is flexible enough for normal applications and it is always sufficiently flexible for use in tire sidewalls. Its original whiteness and its resistance to discoloration and tackiness upon aging are slightly better than in the case of Example 18. The composition of Example 20 is somewhat similar to that of Example 19, and the original whiteness, resistance to discoloration and tackiness upon aging are likewise slightly better than for the composition of Example 18. However, it tended to be very slightly sticky during its "processing," and although the resulting product was very satisfactory in that the vulcanizate was somewhat stiffer (which is desirable for some applications), the composition is not quite as advantageous as the composition disclosed in Example 19. Accordingly, the composition of Example 19 is preferred. Thus, the approximate range of parts by weight of the various constituents in applicant's composition per 100 parts by weight of copolymer are most preferably as follows:

About 50 to 100 parts by weight of titanium dioxide, about 50 to 100 parts by weight of magnesium oxide, about 1 to 3% of stearic acid if present, about 0.10 to 0.30 part by weight of ultramarine blue if present, about 10 to 20 parts by weight of zinc oxide, about 2 to 3 parts by weight of sulfur as the vulcanizing agent, and about .75 to 1.5 parts by weight of a tetra alkyl thiuram mono- or poly-sulfide as a vulcanizing accelerator.

Furthermore, the amount of stearic acid if employed, may be controlled as desired for the particular processing equipment as a mold release agent, and although metal stearates such as zinc stearate are operative, stearic acid is preferred. A blue pigment also may be incorporated to obtain a better shade of white. Although ultramarine blue has been found satisfactory in these experiments, other conventional blue pigments which are compatible with Butyl type rubbers are also operative but not as preferred as ultramarine blue. The concentration of the bluing agent may be adjusted, depending upon the ratio of the magnesium oxide to the titanium oxide and the amount of total titanium oxide present. For example, since magnesium oxide does not have the hiding power of titanium dioxide, a change in the proportion of magnesium oxide to titanium dioxide would require a change in the amount of the bluing agent, if a bluing agent is employed.

Insofar as the degree of fineness of the sulfur is concerned, the sulfur may pass through a 50 mesh to about 500 mesh screen. However, a fineness of about 200 to 325 mesh or finer appears to be preferred for white compositions.

EXAMPLE 21

A commercial grade of GR-I-18 rubber containing about 1.5-1.8 mol percent isoprene with the balance being isobutylene was compounded as follows:

|  | Parts of weight |
|---|---|
| GR-I-18 (non-staining) [1] | 100 |
| Titanium dioxide | 75 |
| Magnesium oxide | 25 |
| Stearic acid | 1.0 |
| Zinc oxide | 10 |
| Sulfur | 2.0 |
| Tetra methyl thiuram disulfide | 1.25 |

[1] (GR-I-18 made in accordance with the process for producing Butyl #3, supra, wherein the non-staining qualities were imparted by adding 0.25 part by weight of lauroyl p-amino phenol thereto. Another suitable material in place of the lauroyl p-amino phenol is 2,2'-methylene bis(4-methyl, 6-tertiary butyl phenol).)

The above composition was then cured for 30 minutes at 320° F. and after 20 months of outdoor aging in straight and in looped form according to A.S.T.M. Standard Method D518-44, the composition was not cracked, crazed, or discolored, its surface was dry, and its physical characteristics are now tabulated:

| | |
|---|---|
| Tensile strength (p.s.i.) | 2,225 |
| Elongation (E) in percent | 700 |
| Modulus (p.s.i.)— | |
| At 300 % E | 250 |
| At 500% E | 525 |
| At 600% E | 1,100 |

While there are above described a number of specific embodiments of the present invention, it is possible to produce still other embodiments thereof since obviously resort may be had to various modifications and variations without departing from the spirit of the invention or the scope of the appended claims.

What is claimed is:

1. In a light colored vulcanizable rubbery polymeric composition of improved weathering and discoloring resistance containing the combination of magnesium oxide, titanium dioxide, zinc oxide, and a copolymer of a major proportion of isobutylene and a minor proportion of a conjugated diolefin of about 4 to 8 carbon atoms, the improvement which comprises that said composition contains per 100 parts by weight of said copolymer, about 15 to 100 parts by weight of magnesium oxide, about 10 to 125 parts by weight of titanium dioxide and about 5 to 50 parts by weight of zinc oxide.

2. The vulcanizable composition of claim 1 in which said composition contains a vulcanization accelerator in an amount sufficient to accelerate vulcanization.

3. The vulcanizable composition of claim 1 wherein said composition also contains about 0.5 to 2.0 parts by weight of tetramethyl thiuram disulfide.

4. The vulcanization composition of claim 1 in which said composition also contains the combination of about 0.5 to 2.0 parts by weight of a tetra alkyl thiuram disulfide, about 1 to 3 parts by weight of sulfur, and about 0 to 0.3 part by weight of ultramarine blue.

5. In a vulcanized light colored rubbery composition of improved weathering and discoloring resistance which has been produced by the process which comprises heating at about 295° to 350° F. a copolymer of a major proportion of an isoolefin of about 4 to 7 carbon atoms and a minor proportion of a conjugated diolefin of about 4 to 12 carbon atoms, magnesium oxide, titanium dioxide, and zinc oxide in the presence of a vulcanizing agent, the improvement which comprises that said composition contains per 100 parts by weight of said copolymer, about 15 to 100 parts by weight of said magnesium oxide, about 10 to 150 parts by weight of said titanium dioxide and about 5 to 50 parts by weight of said zinc oxide.

6. A vulcanized light colored rubbery composition according to claim 5 in which the isoolefin is present in an amount of about 90 to 99% by weight, the conjugated diolefin contains about 4 to 8 carbon atoms and is present in an amount of about 1 to 10 parts by weight, the magnesium oxide is present in an amount of about 50 to 100 parts by weight, the titanium dioxide is present in an amount of about 50 to 100 parts by weight, the zinc oxide is present in an amount of about 5 to 20 parts by weight and said composition further contains about 1 to 5 parts by weght of sulfur.

7. In a vulcanized white rubbery composition of improved weathering and discoloring resistance which has been produced by the process comprising vulcanizing for about 4 to 8 minutes at about 350° F. to about 40 to 60 minutes at about 295° F. in the presence of about 2 to 3 weight percent of sulfur and a minor proportion of tetramethyl thiuram disulfide, a copolymer of about 96 to 99 weight percent of isobutylene and about 1 to 4 weight percent of isoprene, titanium dioxide, magnesium oxide and zinc oxide, the improvement which comprises that said compostion contains per 100 parts by weight of said copolymer, about 50 to 100 parts by weight of titanium dioxide, about 15 to 100 parts by weight of said magnesium oxide and about 5 to 20 parts by weight of said zinc oxide, said composition also containing a vulcanizable quantity of sulfur, said sulfur being of a size at least sufficiently fine to pass through a 200 to 325 mesh screen, the surface of said vulcanized composition having been dusted with a member selected from the group consisting of talc and mica; said vulcanized white rubbery composition having a tensile strength of at least about 1300 p.s.i., a percent elongation of at least about 500%, an extension modulus at 300% elongation of at least about 400 p.s.i., and a Shore hardness of at least about 50.

8. In a light colored vulcanizable rubbery composition of improved weathering and discoloring resistance comprising a copolymer of about 90 to 99 weight percent of isobutylene and about 1 to 10 weight percent of isoprene, magnesium oxide, titanium dioxide, and zinc oxide, the improvement which comprises that said composition contains about 25 to 100 parts by weight of said magnesium oxide, about 50 to 100 parts by weight of said titanium dioxide, and about 10 to 20 parts by weight of said zinc oxide.

References Cited in the file of this patent

UNITED STATES PATENTS 2,631,984     Crawford _____ Mar. 17, 1953

FOREIGN PATENTS 112,875     Australia _____ Apr. 7, 1941